Dec. 23, 1958 L. M. LAWTON, JR 2,866,193
LOW ALTITUDE ALTIMETER
Filed Feb. 19, 1954 2 Sheets-Sheet 1

INVENTOR.
LEWIS M. LAWTON, JR.
BY
ATTORNEY.

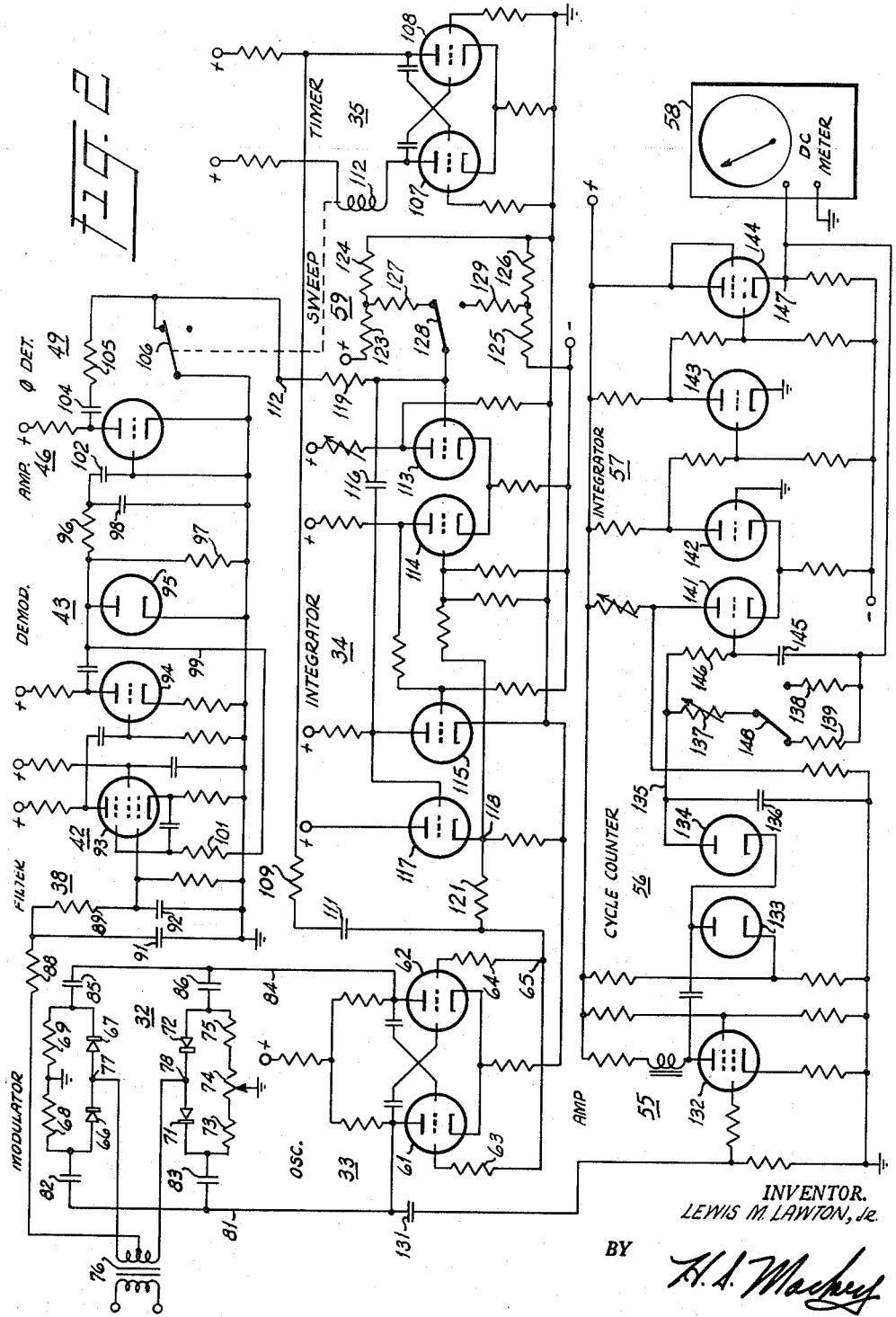

United States Patent Office 2,866,193
Patented Dec. 23, 1958

2,866,193

LOW ALTITUDE ALTIMETER

Lewis M. Lawton, Jr., Rye, N. Y., assignor to General Precision Laboratory Incorporated, a corporation of New York Application February 19, 1954, Serial No. 411,433

6 Claims. (Cl. 343—14)

This invention relates to apparatus for measuring distances by means of frequency modulated radio waves.

One known form of radio ranging apparatus is that in which a frequency modulated wave is propagated toward an object the range of which is to be ascertained. A portion of the energy reflected from the object is received and its frequency compared with the instantaneous frequency of the transmitted wave. The difference in frequency between the transmitted and received waves is proportional to the range of the object. One of the major objections to such apparatus is the difficulty in measuring the frequency difference with sufficient accuracy. If a signal is noise free and comprises but a single frequency, its frequency can be measured quite readily. However, the signal received after reflection from an irregular surface, such as the earth, is not a single frequency but comprises a band of frequencies having many random fluctuations, usually called "noise," superimposed.

If the apparatus is used as an airborne altimeter, the band of frequencies will shift as the absolute altitude of the aircraft changes so that comparatively quick measurement of the frequency of the signal is required.

It is an object of this invention to measure the range of an object accurately and continuously.

A more specific object is to provide apparatus suitable for measuring distances of less than one thousand feet continuously and accurately.

In accordance with a preferred embodiment of the invention, frequency modulated, continuous wave, microwave energy is propagated toward the object the range of which is to be measured. A portion of the energy reflected from the object is received and mixed with a portion of the microwave energy then being generated to produce a beat frequency proportional to range. The beat frequency is modulated with a signal from a local oscillator and the resulting modulation signal operates through a zero frequency discriminator circuit to maintain the mean frequency of the local oscillator equal to that of the beat frequency. The frequency of the local oscillator is measured by means of a cycle counter from which a unidirectional voltage proportional to range is derived. The range may be visually displayed or recorded with a suitable D.-C. instrument.

For a complete understanding of the invention, reference may be made to the accompanying drawing in which:

Figure 2 is a circuit diagram of the portion of the apparatus appearing below the dashed line of Fig. 1.

Figure 1:
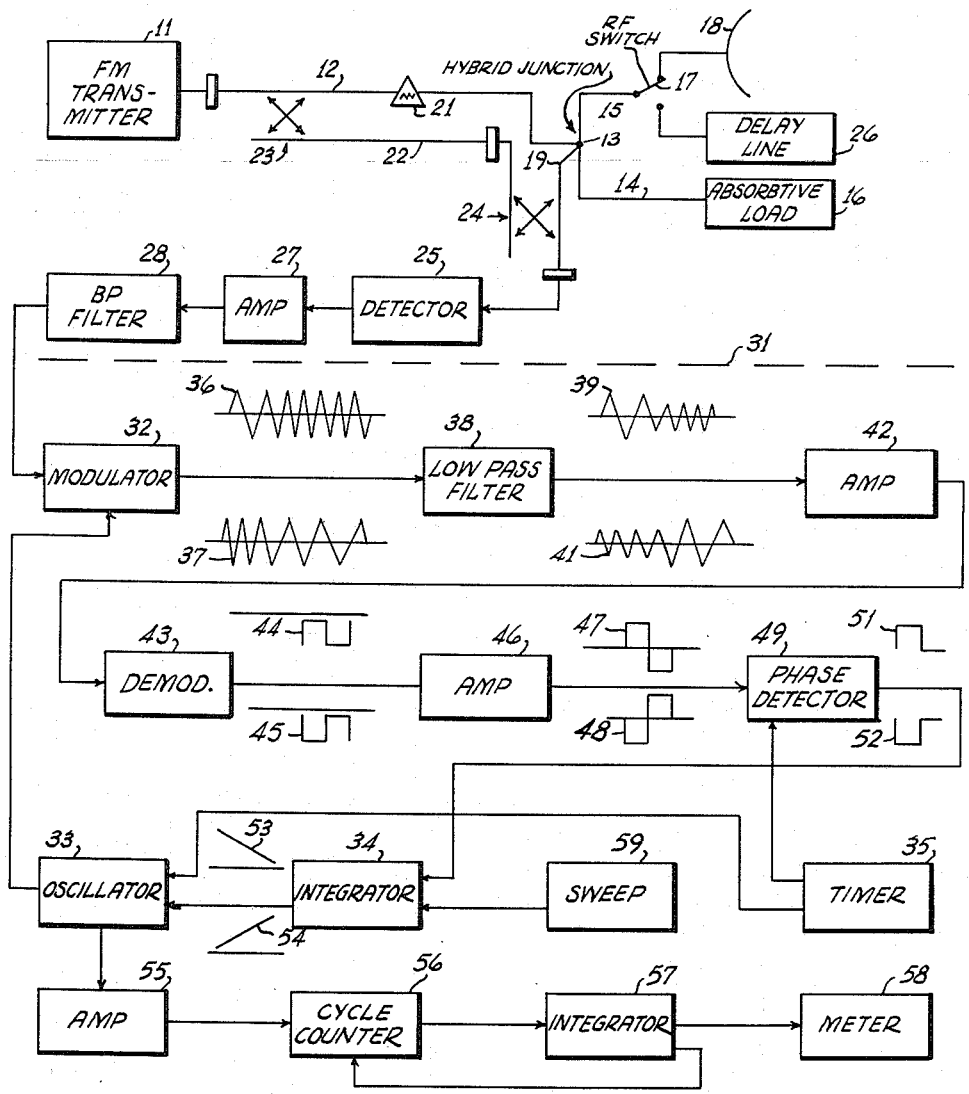
Figure 1 is a block diagram of a preferred embodiment of the invention.

Referring now to Fig. 1, there is shown a frequency modulated microwave transmitter 11, the output of which is led by means of a rectangular waveguide 12 to a hybrid junction 13. The energy from waveguide 12 divides equally between waveguides 14 and 15, the energy in guide 14 being dissipated in an absorptive load 16. The energy in guide 15 is led through an R. F. switch 17 to an antenna 18.

After reflection from the object whose range is to be ascertained, the energy is received at the antenna 18 and passes through switch 17 and waveguide 15 to the hybrid junction 13. Here the energy divides equally between waveguides 12 and 19.

Included in the waveguide 12 is a resistive element 21 which serves to decouple the antenna from the transmitter so that changes in the load presented by the antenna will not cause the transmitter to change its frequency. This element 21 may consist of a number of septums of absorbing material, arranged in accordance with conventional practice.

At a point near the transmitter 11, the waveguide 12 is coupled to a waveguide 22 by means of a directional coupler 23. The waveguide 22 is similarly coupled to waveguide 19 by means of a directional coupler 24. The received energy in the guide 19 and a portion of the energy from transmitter 11 are led to a detector 25 where a beat frequency proportional to the range of the object is produced.

A delay line 26 may be connected in place of the antenna 18 by shifting the position of the R. F. switch 17. The line 26 has a fixed known delay period and may be used to calibrate the apparatus.

The beat frequency from detector 25 is led through an amplifier 27 to a band-pass filter 28. The filter 28 is designed to pass the range of frequencies expected to be encountered and to attenuate all other frequencies. In a specific embodiment of the apparatus, the mean frequency of the transmitter 11 is 9375 mc. modulated at 200 C. P. S. to such an extent that a beat frequency of 800 to 16,000 cycles represents a range of from 50 to 1000 feet. In this case, the band-pass filter 28 is arranged to pass the band from 800 to 16,000 cycles.

The apparatus below the dashed line 31 of Fig. 1 is the apparatus for deriving range information from the output of the filter 28. The signal is led to a modulator 32 where it is mixed with a signal from a local oscillator 33. Oscillator 33 is capable of generating signals in the range of 800 to 16,000 cycles. The frequency of these signals is controlled jointly by the output of an integrator 34 and a timer 35. The timer 35 periodically switches the bias on oscillator 33 so as to shift its frequency by approximately 200 cycles. The frequency of the timer is not critical, 2 C. P. S. having been found satisfactory. It is only necessary that the switching be performed at a rate several times the tracking speed of the loop so that apparatus will follow the average frequency of the oscillator 33 rather than the frequency of each switching half cycle.

To describe the operation of the apparatus, let us assume that the mid-band frequency of the signal from filter 28 is $f_0$ which corresponds to a certain range. The timer 35 has two states, A and B. When in state A, the oscillator 33 will generate a certain frequency, $f_1$, and when timer 35 is in state B, oscillator 33 will generate a higher frequency, designated as $f_2$. The purpose of the apparatus to be described is to maintain the mean frequency, $f_m$, equal to $f_0$. In other words, the object is to make $f_1$ and $f_2$ lie below and above $f_0$ by equal amounts.

Since the frequency of oscillator 33 is shifted abruptly, the output of modulator 32 will similarly shift. If the mean frequency, $f_m$, of the oscillator is higher than $f_0$, then when the timer is in state A the modulator output will be a low frequency. When the timer shifts to state B, the modulator output will shift to a high frequency. This change in frequency is indicated schematically by the waveform 36. Similarly, if $f_m$ is lower than $f_0$, the output of modulator 32 will be a high frequency when the timer is in state A and a low frequency when the timer is in state B, as indicated by the waveform 37. If $f_m$ equals $f_0$, then the output of modulator 32 will be a single frequency.

The output of modulator 32 is led through a low-pass filter 38. The characteristics of this filter are not critical and a filter whose response is 3 db down at 100 cycles has been found to be satisfactory. The filter 38 attenuates the higher frequency more than the lower frequency so that its output is as indicated by the waveforms 39 and 41 when $f_m$ is higher and lower respectively than $f_0$. The output of the filter 38 is passed through an amplifier 42 to a demodulator 43. The demodulator 43 recovers the envelope of its input as indicated by the waveforms 44 and 45. As shown in the drawing, this output is a square wave the phase of which indicates whether $f_m$ is higher or lower than $f_0$. The signal is next passed through an amplifier 46 which increases the amplitude of the wave and centers it about the zero voltage axis as indicated by the waveforms 47 and 48.

It will be recalled that the timer 35 controls the frequency shift of the oscillator 33. It is therefore possible to select one of the half cycles of the output of amplifier 46 and this is done by means of the phase detector 49, which is controlled by the timer 35. The half cycle selected is that corresponding to state A of the timer so that the output of the phase detector 49 is either positive or negative depending upon whether $f_m$ is higher or lower than $f_0$. These two conditions are illustrated by the waveforms 51 and 52. The output of the phase detector 49 is led to the integrator 34. As will be more fully explained, if the input to the integrator is positive, the output will decrease while if the input is negative, the output will increase. These conditions are indicated by the waveforms 53 and 54 respectively. If the input is zero the output will remain constant. The output of integrator 34 is utilized to control the frequency of the oscillator 33. If the output of phase detector 49 is positive, which will occur when $f_m$ is greater than $f_0$, the output of the integrator 34 will fall thus decreasing the bias of oscillator 33 and decreasing its frequency. When $f_m$ is equal to $f_0$, the output of phase detector 49 will be zero and the output of intergrator 34 will remain constant.

The oscillator 33 provides a noise free signal the average frequency of which is equal to that of the beat frequency produced in detector 25. A signal from the oscillator 33 is passed through an amplifier 55 to a cycle counter 56. The cycle counter 56 and an integrator 57 cooperate to produce a unidirectional voltage the magnitude of which is directly proportional to the average frequency of the oscillator 33. The output of the integrator 57 may be utilized to operate any suitable visual or recording apparatus such as the meter 58.

The foregoing sequence of operations can take place only if the oscillator frequency, $f_m$, is reasonably close to that of the incoming signal from the band pass filter 28. Some means must be provided for varying $f_m$ until the apparatus "locks on" to the incoming signal. This necessity arises when operation is started or if, for any reason, the signal is lost. The sweep circuit 59 provides for the application of a large voltage, alternately positive and negative, to the integrator 34. These voltages allow the oscillator 33 to be "swept" in frequency between its upper and lower limits. When it passes through the frequency of the signal from filter 28, the apparatus will "lock on" to this signal, and the voltages from sweep circuit 59 may be removed.

Fig. 2 is a circuit diagram of that portion of the apparatus shown below the dashed line 31 of Fig. 1. The oscillator 33 is a free running multivibrator comprising triodes 61 and 62. Square waves of opposite polarity appear on the anodes of these tubes. The grids are returned through resistors 63 and 64 to a junction point 65 so that the frequency of the oscillator may be controlled by adjusting the potential of the junction point 65.

The modulator 32 may be any of several kinds. The modulator shown comprises serially connected diodes 66 and 67 shunted by the series combination of resistors 68 and 69 the junction of which is grounded. Serially connected diodes 71 and 72 are shunted by the series combination of resistors 73, 74 and 75, an adjustable tap on resistor 74 being grounded. A push-pull input is obtained from the band-pass filter 28 by means of a transformer 76. One end of the secondary of transformer 76 is connected to the point 77 which is the junction of diodes 66 and 67. The other end of the secondary is connected to the point 78 which is the junction of diodes 71 and 72. The output of oscillator 33 is taken from the anodes of tubes 61 and 62. One output is applied via conductor 81 through capacitor 82 to the junction of diode 66 and resistor 68 and is also applied through capacitor 83 to the junction of diode 71 and resistor 73. The other lead from oscillator 33 is applied via conductor 84 through capacitor 85 to the junction of diode 67 and resistor 69 and also through capacitor 86 to the junction of diode 72 and resistor 75. The output of modulator 32 is taken from the center tap of transformer 76.

The output of oscillator 33 is substantially a square wave and the modulator 32 in effect multiplies the input from filter 28 successively by plus one and minus one for equal periods of time at a cyclic rate determined by the frequency of oscillator 33. When conductor 81 is positive, diodes 66 and 67 conduct thus clamping the junction 77 to ground potential. The junction 78 is free to vary in potential and follows the input wave, one half of this potential appearing at the center tap of transformer 76. When conductor 84 is positive and conductor 81 negative, the diodes 72 and 71 conduct, thus clamping the junction point 78 to ground. The junction point 77 is then free to vary in potential and follows the input wave, one half of this potential appearing at the center tap of transformer 76. Therefore the potential of the center tap is the input signal multiplied successively by $+k/2$ and $-k/2$, where $k$ is the turns ratio of transformer 76. It can be shown mathematically that the multiplication of a sine wave by a symmetrical square wave yields an output containing the sum and difference frequencies, along with higher frequency terms, but neither original frequency.

The output from modulator 32 is led to the low-pass filter 38 comprising resistors 88 and 89 and capacitors 91 and 92. From the low-pass filter 38 the signal is led to amplifier 42 comprising a pentode 93 and triode 94. The output of the amplifier 42 is passed through a demodulator 43 which recovers the envelope of the signal. The demodulator comprises a diode 95 and a filter including resistors 96 and 97 and a capacitor 98. The positive half cycles are grounded by diode 95 and the negative half cycles are smoothed by means of the filter. The smoothed potential at the anode of diode 95 is used as a gain control potential and is applied through conductor 99 and resistor 101 to the suppressor of pentode 93.

The signal from the demodulator 43 is coupled by means of a capacitor 102 to an amplifier 46 comprising a triode 103. The anode of triode 103 is coupled through a capacitor 104 and a resistor 105 to the phase detector 49. The amplifier 46 amplifies the signal and also, by virtue of condensers 102 and 104, centers the signal about the zero axis so that the output is a square wave which is positive for one half cycle and negative for the other half cycle. The phase detector 49 comprises a switch 106 operated by the timer 35.

The timer 35 is a free running multivibrator comprising triodes 107 and 108 the frequency of which is not critical, but has been selected to be about 2 C. P. S. The anode of triode 108 is coupled by means of resistor 109 and a capacitor 111 to the junction point 65 in order to switch the frequency of oscillator 33. The anode circuit of triode 107 includes a winding 112 which operates the switch 106. During one half of the cycle of the timer 35 the switch 106 grounds the output of amplifier 46 while during the other half cycle, the output is free to assume any potential dictated by the incoming signal. The phasing is selected so that if the frequency of oscillator 33 is too high, the negative half cycles are grounded while if the frequency is too low the positive half cycles are grounded. This selection is indicated by the waveforms 51 and 52 of Fig. 1. The output of the phase detector 49 is connected to the junction 112 which constitutes the input to the integrator 34.

The integrator 34 is a conventional construction and comprises a high gain direct coupled polarity reversing amplifier and a large negative feedback capacitor. The amplifier comprises cathode coupled triodes 113 and 114, the anode of triode 114 being resistor coupled to the grid of triode 115. A large feedback capacitor 116 is connected between the anode of triode 115 and the grid of triode 113. A triode 117 connected as a cathode follower completes the integrator, the output being taken from the cathode at junction point 118.

The operation of the integrator 34 may be briefly described as follows. A small positive potential appearing at junction 112 will tend to make the grid of triode 113 positive. This will cause the potential of the anode of triode 115 to fall rapidly and this negative going potential will be coupled through the feedback capacitor 116 to the grid of triode 113 thus returning the grid to substantially ground potential. The input signal at junction 112 will then flow through the large input resistor 119 to the capacitor 116. As long as a positive signal remains at junction 112, capacitor 116 will continue to charge and the potential of the anode of triode 115 will continue to fall as will the potential of the output junction 118. If the input signal at junction 112 falls to zero, the output at junction 118 will remain constant at its last attained value. The result is that the current through resistor 119 is integrated and, if resistor 119 is very large, this is equivalent to integrating the potential of the junction 112. Similarly, if the potential of junction 112 is negative, the potential of junction 118 will rise.

The junction 118 is coupled by means of resistor 121 to the junction point 65 to control the frequency of oscillator 33. If the frequency of oscillator 33 is too high, the output of phase detector will be positive and this positive potential will cause the junction point 118 and the junction 65 to fall in potential thus decreasing the frequency of the oscillator 33. When the mean frequency, $f_m$, is equal to the frequency from the band-pass filter 28, the output of phased detector 49 will be zero and the potential of the junction 118 will remain constant.

As previously pointed out, the apparatus can "lock on" to the input signal only if the frequency of oscillator 33 is reasonably close to that of the input signal. In order to locate the input signal, the sweep circuit 59 is provided. A voltage divider comprising serially connected resistors 123 and 124 is connected between a source of positive potential and ground and a similar voltage divider comprising resistors 125 and 126 is connected between a source of negative potential and ground. The junction of resistors 123 and 124 is connected through a large resistor 127 to one contact of a switch 128 while another large resistor 129 connects the junction of resistors 125 and 126 to another fixed contact of the switch 128. The movable arm of switch 128 is connected to the grid of triode 113. The input to the integrator can thus be made highly positive or highly negative thus causing the output of integrator 34 to fall or rise, which in turn sweeps the frequency of oscillator 33 between its lower and upper limits. When the average frequency of oscillator 33 reaches that of the input signal from the filter 28, the output of the phase detector 49 applied through resistor 119 will override the effect of the voltages applied by the sweep circuit 59 and cause the apparatus to "lock on" to the input signal. The voltage dividers 123—124, 125—126 are designed so that the potentials appearing at their respective junctions are large compared to the signal received from phase detector 49. These large potentials cause the oscillator 33 to sweep rapidly from one extreme to the other. However, the resistors 127 and 129 are made large compared to resistor 119 so that a signal from the phase detector 49 can override the signal from the sweep circuit 59.

The output of integrator 34 at junction 118 is a unidirectional voltage which rises and falls with the increase and decrease in frequency of the oscillator 33. It would be possible to use this potential as an indication of frequency. However, it is difficult to make an oscillator such as oscillator 33 the frequency of which is linearly related to its bias. It is therefore preferred to measure the frequency of oscillator 33 by separate apparatus.

The anode of triode 61 is coupled through a capacitor 131 to the input of the amplifier 55 which comprises a tetrode 132. The amplifier stage 55 shapes and limits the signal from oscillator 33 so as to present a square wave of constant amplitude to the cycle counter 56.

The cycle counter 56 comprises a diode 133 which grounds substantially the entire positive half cycle of the square wave from amplifier 56. A diode 134 blocks the positive half cycles but passes the negative half cycles to the conductor 135. A "bucket" capacitor 136 is connected between conductor 135 and ground. Each negative half cycle thus tends to charge capacitor 136 by an equal amount irrespective of frequency. A resistor 137 is connected to conductor 135 to discharge the capacitor 136. The resistor 137 could be connected to ground, in which case the potential of conductor 135 would be proportional to the frequency of the wave tending to charge the capacitor 136. However, it is preferred to return resistor 137 to the output of the integrator 57 through one or the other of resistors 138 and 139.

The integrator 57 is similar to the integrator 34 and comprises triodes 141, 142, 143, 144 and a feedback capacitor 145. The conductor 135 is connected through a large resistor 146 to the grid of triode 141. Triode 141 is cathode coupled to triode 142, the anode of which is resistor coupled to the grid of triode 143. Triode 144 is a cathode follower. The output is taken from junction 147 at the cathode of the tube 144. The feedback capacitor 145 is connected between the output junction 147 and the grid of triode 141.

In operation, the negative half cycles of the square wave pass through diode 134 to conductor 135, where they start to charge the capacitor 136 and drive the grid of triode 141 slightly negative. As soon as this grid becomes ever so slightly negative, a large positive voltage appears at output junction 147. This positive going potential is immediately coupled back to the grid of triode 141 through the capacitor 145, holding the grid substantially at ground potential. At the same time, the positive output voltage is applied through resistor 139, a switch 148, and resistor 137 to the conductor 135, thus holding the conductor 135 at substantially ground potential. The net result is that the voltage at the output junction 147 is just sufficient to maintain conductor 135 at ground potential, and this voltage is directly proportional to the mean frequency of the oscillator 33.

The output voltage may be used to operate any desired instrument, such as the visual indicating meter shown at 58. Any portion of the scale may be expanded by suitably selecting the values of resistors 137, 138 and 139. For example, these resistors may be selected so that the switch 148 can make full scale deflection correspond to either 500 or 1,000 feet.

The invention has been described with respect to a specific embodiment. However, many modifications may be made within the scope of the invention. As examples, although the described apparatus is particularly suited for use as an altimeter, it may be used, with or without modification, to measure other distances. The particular operating frequencies are illustrative only, and may be modified. The configuration of the various elements, such as the modulator, the oscillator, the timer, etc., may be altered without departing from the scope of the invention.

What is claimed is:

1. Radio echo ranging apparatus comprising, means for generating and transmitting frequency modulated radio frequency energy, means for receiving a portion of the transmitted energy after reflection from an object, means for mixing the received energy with a portion of the generated energy to obtain a signal the frequency of which is proportional to the range of said object, an alternating current generating means, means for cyclically shifting the output of said generating means upward and downward in frequency, and means responsive to said signal for continuously adjusting the mean frequency of said alternating current generating means to equal that of said signal.

2. Radio echo ranging apparatus comprising, means for generating and transmitting frequency modulated radio frequency energy, means for receiving a portion of the transmitted energy after reflection from an object, means for mixing the received energy with a portion of the generated energy to obtain a signal the frequency of which is proportional to the range of said object, a local oscillator, means for cyclically shifting the output of said local oscillator upward and downward in frequency, means for mixing said signal with the output of said local oscillator, and means responsive to the output of said mixing means for maintaining the mean frequency of said local oscillator equal to that of said signal.

3. Radio echo ranging apparatus comprising, means for generating frequency modulated radio frequency energy, means for transmitting a first portion of said generated energy toward an object the range of which is to be measured, means for receiving a portion of said transmitted energy after reflection from said object, means for mixing a second portion of said generated energy with said received energy to produce a signal the frequency of which is proportional to the range of said object, an alternating current generating means, means for cyclically shifting the output of said alternating current generating means upward and downward in frequency, means responsive to said signal for adjusting the mean frequency of said alternating current generating means to equal that of said signal, and means for producing a unidirectional voltage the magnitude of which is proportional to the mean frequency of said alternating current generating means.

4. Radio echo ranging apparatus comprising, means for generating and transmitting frequency modulated radio frequency energy, means for receiving a portion of the transmitted energy after reflection from an object, means for mixing the received energy with a portion of the generated energy to obtain a signal the frequency of which is proportional to the range of said object, a modulator, means for impressing said signal on said modulator, means for alternately impressing on said modulator two alternating voltages of different frequencies, and means responsive to the output of said modulator for simultaneously adjusting the frequencies of said two alternating voltages so that their mean frequency is equal to the frequency of said signal.

5. Radio echo ranging apparatus comprising, means for generating and transmitting frequency modulated radio frequency energy, means for receiving a portion of the transmitted energy after reflection from an object, means for mixing the received energy with a portion of the generated energy to obtain a signal the frequency of which is proportional to the range of said object, a modulator, means for impressing said signal on said modulator, means for alternately impressing upon said modulator two alternating voltages of different frequencies, means responsive to the output of said modulator for controlling the frequencies of said alternating voltages, and means for producing a unidirectional voltage the magnitude of which is proportional to the mean of the frequencies of said two alternating voltages.

6. Radio echo ranging apparatus comprising means for generating frequency modulated radio frequency energy, means for transmitting a first portion of said generated energy toward an object the range of which is to be measured, means for receiving a portion of said transmitted energy after reflection from said object, means for mixing a second portion of said generated energy with said received energy to produce a signal the frequency of which is proportional to the range of said object, a modulator, means for impressing said signal upon said modulator, means for alternately impressing upon said modulator two alternating voltages of different frequencies, means responsive to the output of said modulator for simultaneously adjusting the frequencies of said two alternating voltages so that their mean frequency is equal to that of said signal, and means for deriving a unidirectional voltage the magnitude of which is proportional to said mean frequency.

References Cited in the file of this patent
UNITED STATES PATENTS

| | | |
|---|---|---|
| 2,537,593 | Landon et al. | Jan. 9, 1951 |
| 2,546,973 | Chatterjea et al. | Apr. 3, 1951 |